United States Patent [19]
Adragna et al.

[11] Patent Number: 6,011,706
[45] Date of Patent: Jan. 4, 2000

[54] CONTROL OF THE OUTPUT POWER OF A DC-DC CONVERTER UPON VARYING THE SWITCHING FREQUENCY

[75] Inventors: Claudio Adragna, Monza; Giuseppe Gattavari, Busto Arsizio; Mauro Fagnani, Nerviano, all of Italy

[73] Assignee: SGS-Thomson Microelectronics S.r.l., Agrate Brianza, Italy

[21] Appl. No.: 09/055,639

[22] Filed: Apr. 6, 1998

[30] Foreign Application Priority Data

Apr. 9, 1997 [EP] European Pat. Off. .............. 97830164

[51] Int. Cl.[7] .............................. H02M 1/16; G05F 1/40; H01J 29/70
[52] U.S. Cl. .............................. 363/41; 363/97; 323/288; 315/411
[58] Field of Search .................................. 363/20, 21, 39, 363/40, 41, 74, 97, 131; 323/282, 283, 284, 285, 288, 299, 276, 277, 351; 315/364, 411

[56] References Cited

U.S. PATENT DOCUMENTS 5,335,162  8/1994  Martin-Lopez et al. .................. 363/97
5,680,036  10/1997  Faulk ........................ 323/282
5,804,950  9/1998  Hwang et al. ...................... 323/282 X

FOREIGN PATENT DOCUMENTS 2 298 532  9/1996  United Kingdom .......... H02M 3/335

Primary Examiner—Y. J. Han
Attorney, Agent, or Firm—Allen, Dyer, Doppelt, Milbrath & Gilchrist, P.A.

[57] ABSTRACT

The power output of a static DC—DC converter employing a current mode PWM controller is controlled upon the varying of the switching frequency, by detecting the sawtooth signal produced by the local oscillator generating a DC signal with an amplitude inversely proportional to the frequency. The power output is controlled by alternatively clamping the output voltage of the error amplifier of the PWM controller at a voltage proportional to the amplitude of the DC signal, or by offsetting the signal present on the current sensing resistor by a voltage corresponding to the difference between a constant voltage and the DC signal.

33 Claims, 9 Drawing Sheets

VOLTAGE AT PIN 10 WHEN PIN 15 = GND

CONTROL OF THE OUTPUT POWER OF A DC-DC CONVERTER UPON VARYING THE SWITCHING FREQUENCY

FIELD OF THE INVENTION

The present invention relates to a current mode PWM control circuit (controller) for a static DC—DC converter that is capable of keeping the output power to a substantially constant level independent of the switching frequency.

BACKGROUND OF THE INVENTION

DC—DC static converters are widely used in power supplies, actuating systems, displays, signal processing systems, and the like. Static DC—DC converters are based upon well known basic circuit topologies or configurations, often used alternatively to one another, as for example the so called "flyback" topology, wherein the primary winding of a transformer is driven by a power switch, controlled by a PWM system, switching at a frequency established, for example, by a sawtooth local oscillator. The oscillator has a natural frequency which may be fixed upon connecting an external RC network to the integrated circuit of the controller. The switching frequency may be modified with respect to its design nominal value or otherwise set by a system's clock signal or any equivalent synchronizing signal. In the case of a so-called "boost" topology it is an energy storing inductor that is similarly driven.

As is well known, static converters may function either in a so-called discontinuous current mode (DCM) or in a continuous current mode (CCM). In the former (DCM) mode each cycle begins with the current in the inductor or primary winding of the transformer starting from zero, because the inductance has been allowed to discharge completely during the preceding phase. In contrast, in a CCM mode, the current through the primary winding or the inductor at the beginning of each cycle starts from a value different from zero. The DCM mode is characterized by a regime of triangular shaped currents flowing through the power switch, while the CCM mode is characterized by trapezoidal shaped currents flowing through the power switch.

It is important that the respective current-mode control circuits be effective in controlling the output current level so to prevent damage in case of overloads. A generally followed approach includes using the signal present on a dedicated sensing resistor connected in series with the power switch to activate a current limiting loop when a certain voltage threshold is exceeded on the sensing resistor.

This type of control is commonly referred to as being of the peak current type. It is also known that in these peak current control systems, the output power of the converter increases as the switching frequency increases. In a DCM mode, the increase of the power that may be output is substantially proportional to the switching frequency, while in a CCM mode such an increase of the output power, as a function of the switching frequency, is less marked (nonlinear relationship).

Controllers have been marketed for a long time as they provide an integral part of the majority of current mode PWM system devices and frequently they also include the power switching device. These integrated devices are, for obvious reasons multipurpose. In other words, they are designed for use in different applications, allowing the implementation of supplies and converters of different topology by simply connecting the device in an external circuit which includes components connectable to the respective pins. Often, these integrated devices are produced within a standard package, such as, for example, the DIP16 and SO16W, both having 16 pins.

Among these commercial devices are the L4990 manufactured by SGS-THOMSON MICROELECTRONICS; UC3842A/B manufactured by SGS-THOMSON MICROELECTRONICS, TEXAS INSTRUMENTS, MOTOROLA, SAMSUNG, UNITRODE et al.; LT1241 manufactured by LINEAR TECHNOLOGY; UC3801 and UC3828 manufactured by UNITRODE. Datasheets of all these devices include their functional schemes and characteristics and are readily available. A typical commercial product is the L4990 manufactured by SGS-THOMSON MICROELECTRONICS, a high level block diagram of which is shown in FIG. 1.

In many applications, the switching frequency may vary within a wide range of frequencies that may be either programmable or synchronized by means of clock signals or pulses that may be generated by deflecting circuits, as in the case of CRT monitors. Often the dependency of the output power from the switching frequency may not be tolerated especially in applications destined to function in a wide range of switching frequencies.

In these particularly critical applications use has been made of dedicated circuits capable of implementing an output power compensation so to prevent an excessive increase in output power upon an increase of the switching frequency. For example, in a CRT monitor the synchronizing pulses derived from the deflection circuit are integrated by an R-C lowpass filter to generate a DC voltage proportional to the frequency. This DC signal is applied to the pin of the integrated controller which senses the current crossing the transformers primary winding of a flyback converter. In this way, the controller is deliberately "cheated" to "sense" a current that is in fact higher than the real one as the frequency increases. In this way the maximum current limit is reached with a lower peak current.

Nevertheless, these known approaches have the following drawbacks:

a) the amplitude and duration of the synchronizing pulses must be known and constant and the compensation circuit must be necessarily trimmed according to these parameters;

b) the compensation circuit is not integratable in the controller's functional circuit because of the need to realize a compensation circuit ad hoc, bearing in mind the characteristics of the specific application;

c) the correction effected by the circuit is essentially linear, while the required correction may not be so, ideally; and d) the design and realization of the compensation circuit implies a non-negligeable cost.

SUMMARY OF THE INVENTION

In view of the foregoing background, it is therefore an object of the present invention to provide a method and related compensation circuit capable of assuring a relatively constant power output by the converter with the varying of the switching frequency, that is simpler to realize and is independent of the characteristics of an eventual synchronizing signal that regulates the switching frequency.

A further object of the invention is to implement these important functions in an integrated multipurpose controller.

These and other advantages, which will become more evident,through the ensuing description, are attained through the method of the invention for controlling the power output by a converter that comprises the following steps: a) detecting the signal produced by the local oscillator generating a DC signal whose amplitude is inversely proportional to the frequency; b) alternatively clamping the output power of the error amplifier of the controller to a voltage proportional to the amplitude of such a DC signal, or offsetting the signal existing on the current sensing resistor by a voltage difference between a constant voltage and the DC signal, and by employing the related implementing circuit.

DETAILED DESCRIPTION OF THE PREFERRED EMBODIMENTS

Figure 1:
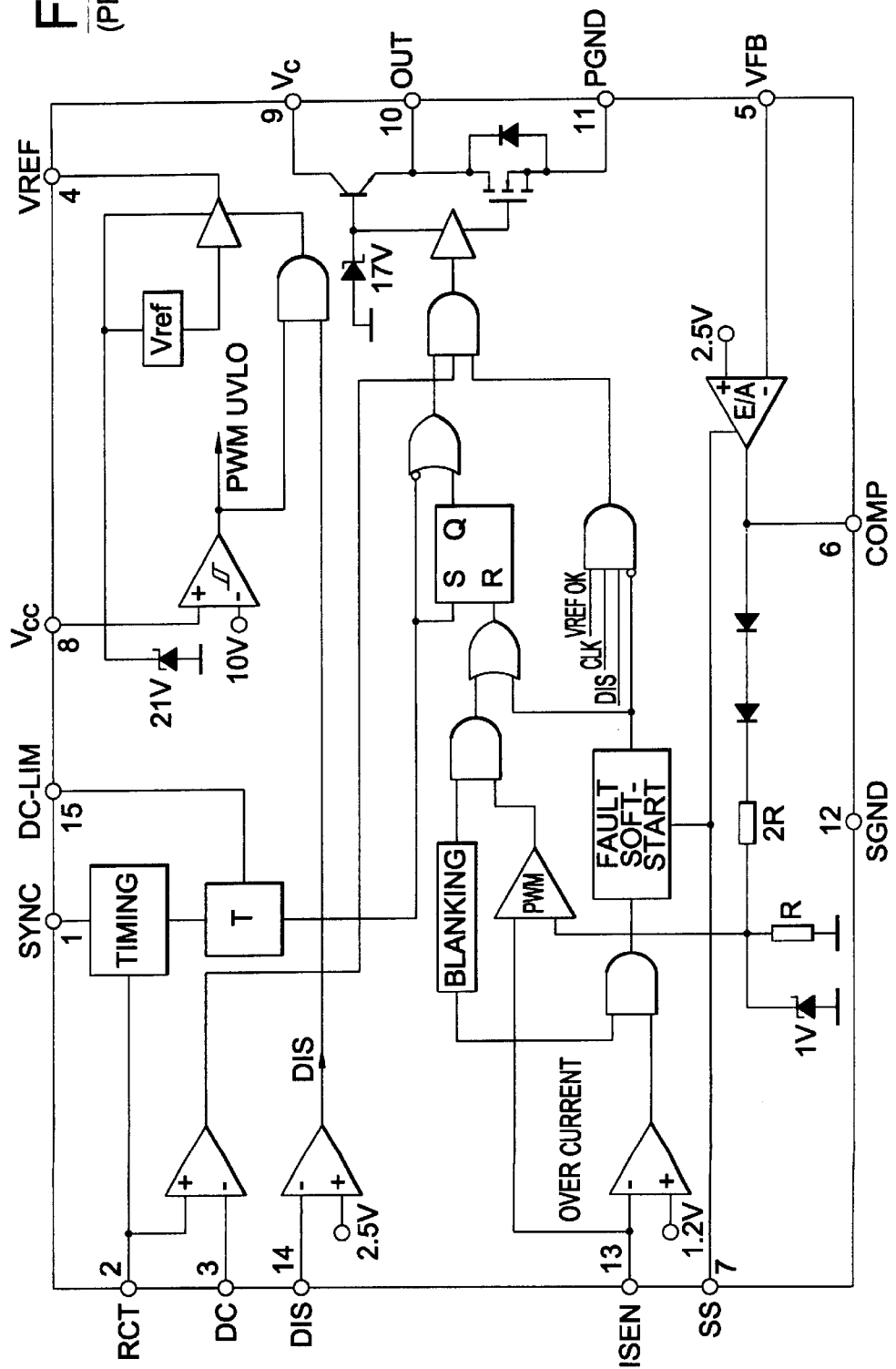
FIG. 1 is a high level block diagram of a typical PWM controller as in the prior art.
Figure 2:
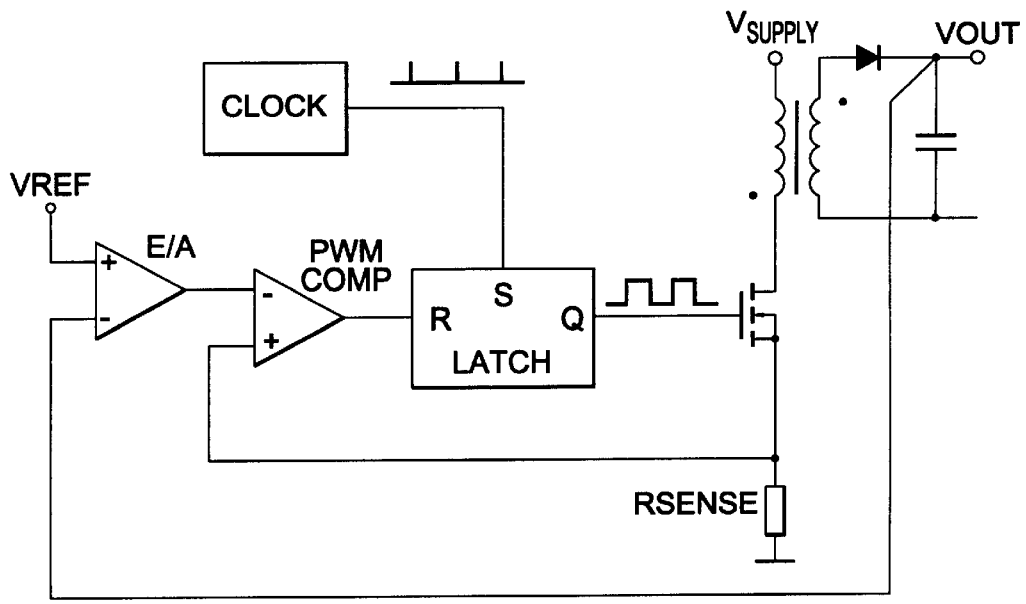
FIG. 2 is the functional scheme of a current mode control circuit for a flyback DC—DC converter as in the prior art.
Figure 3:
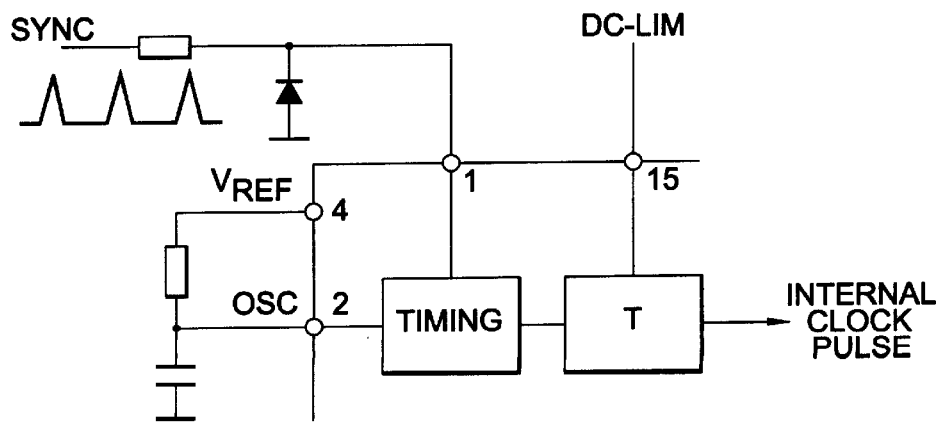
FIG. 3 is a partial scheme showing the synchronization of the oscillating frequency of the sawtooth local oscillator of the device of FIG. 1.
Figure 4A:
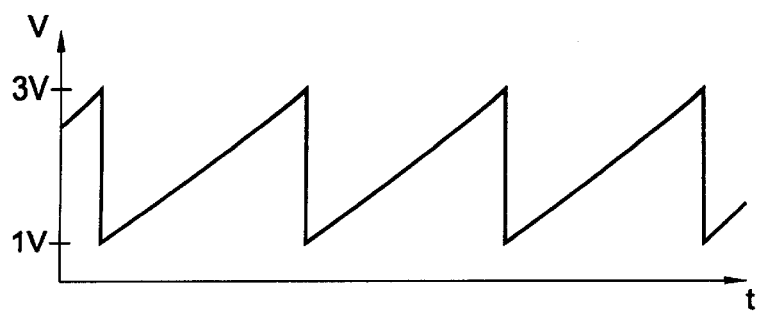
FIG. 4a, 4b, 4c and 4d show the waveforms of the signal generated by the sawtooth local oscillator with and without synchronization and the signal existing on the output pin of the device shown in FIG. 1.
Figure 4B:
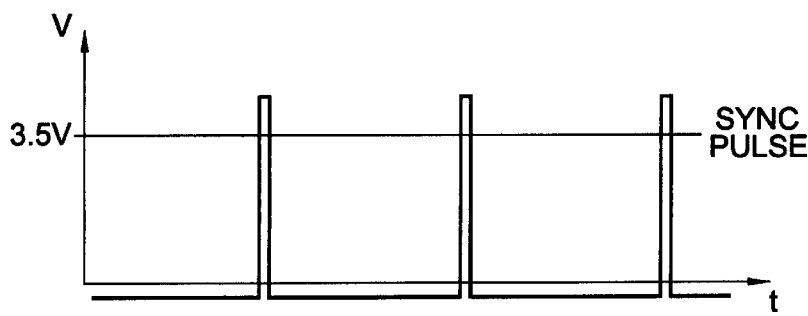
Figure 4C:
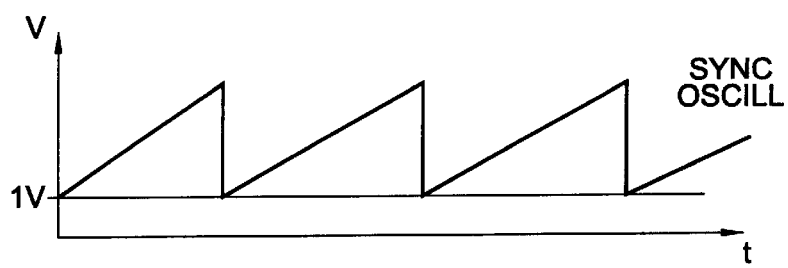
Figure 4D:
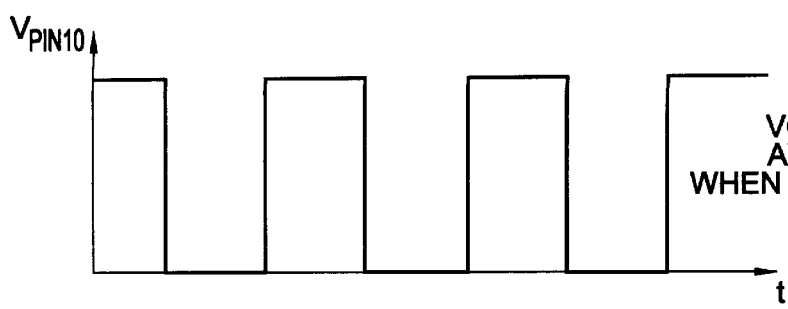

For a better understanding of the problems associated with the implementation of an output power control in a DC—DC converter, the behavior of a flyback converter, whose functional scheme is shown in FIG. 2, may be analyzed. By assuming the use of a state-of-the-art integrated controller, such as the device L4990 of FIG. 1, the functional scheme of the sawtooth local oscillator, synchronized by a synchronizing signal applied to the relative pin (sync), is shown in FIG. 3. The relative sawtooth waveforms produced by the oscillator, with and without the synchronism signal (sync), as well as the signal produced on the output pin 10 of the integrated device of FIG. 1, are respectively shown in FIGS. 4a, 4b, 4c and 4d. Additional basic functions of an integrated PWM controller, such as the L4990 device, may be recognized, for example, by reading the Application Note: "SMPS with L4990 for MULTISYNC MONITORS", by C. W. Park and G. Gattavari, SGS-THOMSON MICROELECTRONICS, AN89 1/1196.

The meaning of the symbols used in the following analysis is indicated in Table 1.

TABLE 1

| SYMBOL | DESCRIPTION |
| --- | --- |
| Pin | Input power of the converter |
| Vin | DC input voltage of the converter |
| Vout | DC output voltage of the converter |
| f | Switching frequency |
| T | Switching period (= 1/f) |
| Lp | Transformer's primary winding inductance |
| n | Transformer's turns ratio (primary/secondary) |
| TON | Duration of the current flow through the primary winding |
| TFW | Duration of the recirculation current through the secondary winding |
| Ipkp | Primary winding peak current (in general) |
| Ipkp (DCM) | DCM primary winding peak current |
| Ipkp (CCM) | CCM primary winding peak current |
| DIp | Primary winding current ripple |
| VE | Equivalent input voltage |
| ZE | Primary winding impedance |
| PinT | Input power at the transition DCM << CCM |
| IpkpT | Primary winding peak current at the transition DCM << CCM |
| VET | Equivalent input voltage at the transition DCM << CCM |
| fT | Switching frequency at the transition DCM << CCM |
| Vcs | Peak voltage on the current sense (pin 13, ISEN) of L4990 |
| VCOMP | Output voltage of the E/A of L4990 (pin 6, COMP) |
| Vf | Direct voltage drop of a diode |
| Rs | Sensing resistance on which Vcs is sensed |
| Vo | Externally introduced offset on the current sense (pin 13, ISEN) of L4990 |
| VCTL | Voltage on the voltage divider (x3) of the PWM comparator of L4990 |
| VCST | Peak voltage on current sense at the transition DCM << CCM |
| fsync | External frequency that synchronizes the oscillator |
| fosc | Oscillator frequency without synchronism |
| k | Ratio between the transition frequency DCM<=>CCM and the natural frequency of the oscillator |
| Vpeak | Peak voltage of the oscillator sawtooth |
| Vclamp | Clamp voltage VCTL required to obtain a constant Pin upon varying the frequency. |
| Plim | Maximum input power obtained with the "Constant Power" function |

By analyzing the functioning of a flyback converter as shown in FIG. 2 and operating in DCM, the peak current in the primary winding is related to the input power by the expression:

$$I_{pkp(DCM)} = \sqrt{\frac{2 \cdot P_{in}}{L_p \cdot f}} \quad (1)$$

and the times intervals of conduction in the primary winding, and of recirculation in the secondary winding are respectively:

$$T_{ON} = \frac{L_p \cdot I_{pkp(DCM)}}{V_{IN}} \quad (2)$$

$$T_{FW} = \frac{L_p \cdot I_{pkp(DCM)}}{n \cdot V_{out}} \quad (3)$$

The sum of which is lower than the switching period T. The transition condition between CCM and DCM (and vice versa) is obviously:

$$T_{ON} + T_{FW} = T = \frac{1}{f} \quad (4)$$

and, by combining the equations (2) and (3) into (4), we obtain the power PinT, that is the maximum power that the system may deliver in DCM (in other words, the minimum power that the system may deliver in CCM):

Then, for VE>VET the system will operate in a DCM mode and in a CCM mode for VE<VET. Obviously, it will be VEmin<VET<VEmax if PinTmin<Pin<PinTmax.

Table 2 shows the possible ranges of VE for typical conditions of the mains voltage and the correspondent values of the ratio PinTmax/PinTmin, of significance for the considerations that will be made below.

TABLE 2

| Mains Vin | 110 Vac ± 20% 80, 190 Vdc | | 220/230 Vac ± 20% 170, 390 Vdc | | Universal 80, 390 Vdc | | |
|---|---|---|---|---|---|---|---|
| | VE | PinTmax/PinTmin | VE | PinTmax/PinTmin | VE | PinTmax/PinTmin | |
| | 30.7, 39.6 | 1.66 | 38.6, 44.3 | 1.73 | 30.7, 44.3 | 2.08 | nVout = 50, |
| | 44.4, 65.5 | 2.17 | 63.0, 79.6 | 1.60 | 44.4, 79.6 | 3.21 | nVout = 100 |
| | 52.2, 83.8 | 2.58 | 79.7, 108.3 | 1.85 | 52.2, 108.3 | 4.31 | nVout = 150 |

$$P_{inT} = \frac{1}{2 \cdot f \cdot L_p} \cdot \left( \frac{V_{in}}{1 + \frac{V_{in}}{n \cdot V_{out}}} \right)^2 \quad (5)$$

Figure 5:
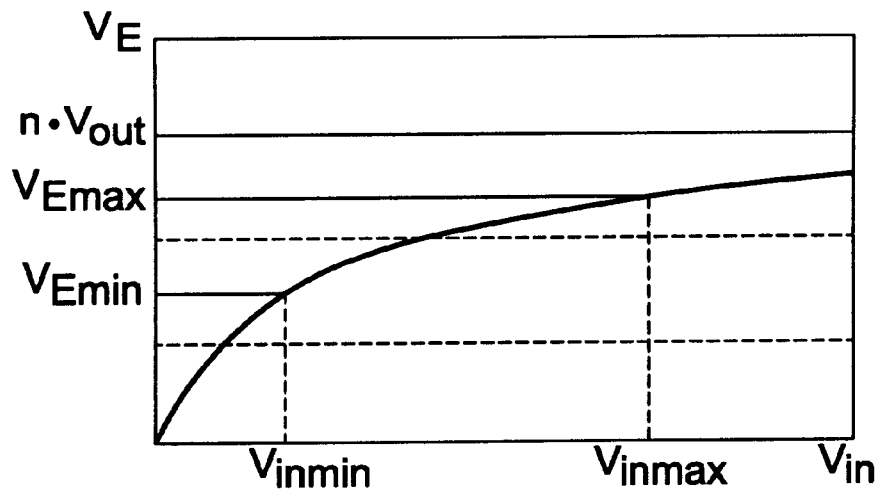
FIG. 5 illustrates the behavior of an equivalent input voltage for the device of FIG. 1.

Equation (5) may be rewritten as:

$$P_{inT} = \frac{V_E^2}{2 \cdot Z_E} \quad (6)$$

by introducing the "equivalent input voltage", VE, and the "primary impedance", ZE, we have:

$$V_E = \frac{V_{IN}}{1 + \frac{V_{IN}}{n \cdot V_{out}}}; \quad Z_E = \frac{1}{f \cdot L_p} \quad (7)$$

the shape of VE is function of Vin is shown in FIG. 5.

The peak primary current, at the transition, becomes:

$$I_{pkpT} = \sqrt{\frac{2 \cdot P_{int}}{f \cdot L_p}} = \frac{1}{f \cdot L_p} \cdot \frac{V_{in}}{1 + \frac{V_{in}}{n \cdot V_{out}}} = \frac{V_E}{Z_E} \quad (8)$$

Equation (5), or similarly equation (6), shows that the transition power for a given system (or for a known values of f and Lp) depends from the input voltage.

Let us then consider the range of values PinT (PinTmin–PinTmax) corresponding to that of VE (VEmin–VEmax) which, in turn, is tied to the range of input voltage Vin.

Figure 6:
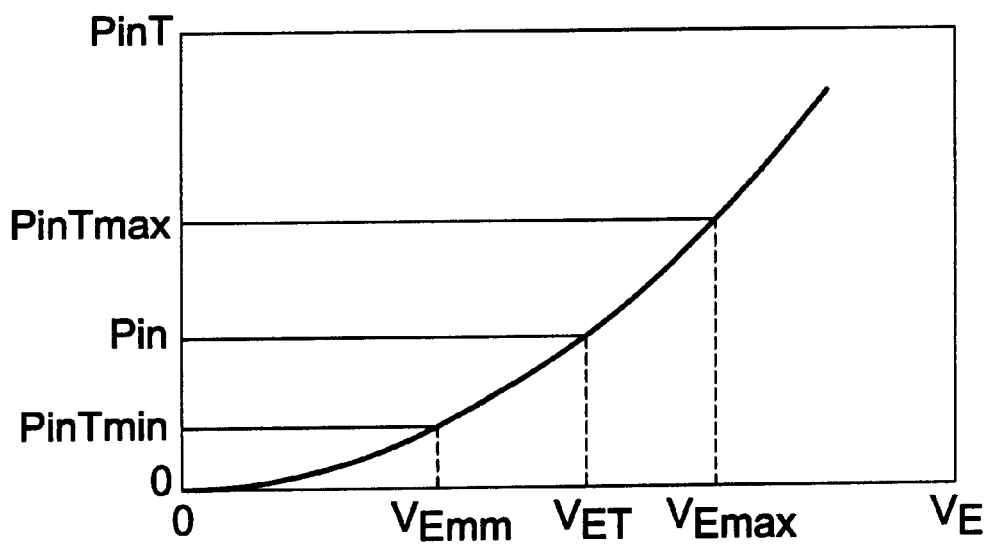
FIG. 6 shows the relationship between the input power and the input equivalent voltage for the device of FIG. 1.

This relationship is diagrammatically shown in FIG. 6.

Parallel it is possible to define a transition voltage VET at which, for a given power Pin, the system switches from DCM to CCM and vice versa:

$$V_{ET} = \sqrt{2 \cdot Z_E \cdot P_{IN}} \quad (9)$$

Again, for an assigned Pin power and for a given input voltage (to which corresponds a certain voltage VE), in a system wherein the operating frequency varies, it is possible to define the frequency that verifies the transition:

$$f_T = \frac{V_E}{2 \cdot L_p \cdot P_{IN}} \quad (10)$$

We thus have a DCM when f<fT and a CCM when f>fT. Obviously, if fT is outside the variation range of the operating frequency, for that Pin and that VE there will be always only one functioning mode.

In CCM, equation (4) is always verified but equations (2) and (3) must be rewritten as follows:

$$T_{ON} = \frac{L_p \cdot \Delta I_p}{V_{IN}} \quad (11)$$

$$T_{FW} = T - T_{ON} = \frac{L_p \cdot \Delta I_p}{n \cdot V_{out}} \quad (12)$$

The peak current is no longer unequivocally correlated to the input power, but depends also on the input voltage:

$$I_{pkp(CCM)} = \frac{P_{IN}}{V_{IN}} \cdot \frac{T}{T_{ON}} + \frac{1}{2} \cdot \Delta I_p \quad (13)$$

This relationship may be written as:

$$I_{pkp(CCM)} = \frac{P_{IN}}{V_E} + \frac{V_E}{2 \cdot Z_E} \quad (14)$$

Figure 7:
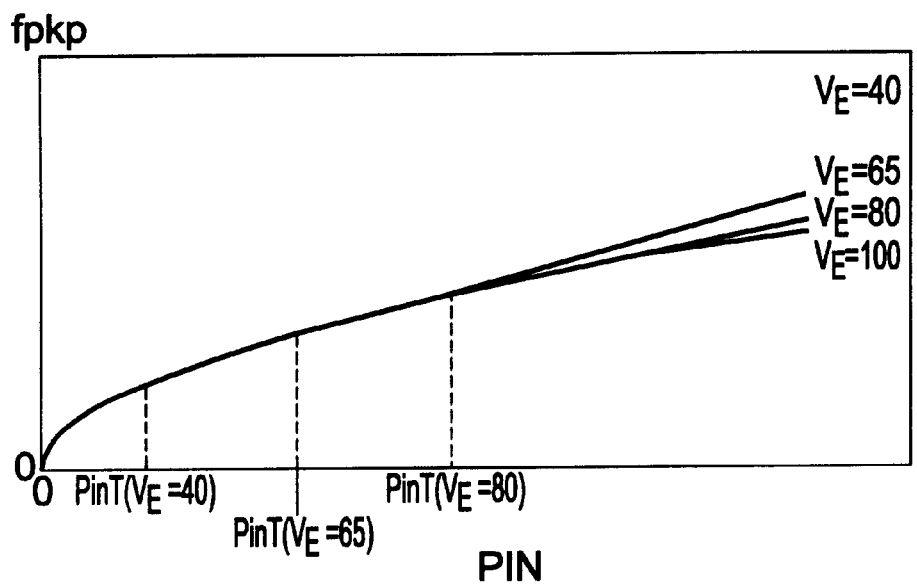
FIG. 7 shows the trend of the peak current on the flyback primary winding of the transformer as a function of the input power for the device of FIG. 1.

It may be demonstrated, by eliminating the derivative in equation (14) that, for a given power Pin>PinTmin the peak current is minimum when VE=VET and, therefore, the peak power will assume the maximum value when VE=VEmin (that is for Vin=Vinmin). FIG. 7 summarizes the behavior of Ipkp including both functioning modes.

On the basis of the preceding considerations and for simplicity, we shall classify the flyback converters in terms on their Pinmax according to the following criterion:
 Pinmax<PinTmin (VET<VEmin): DCM systems;
 PinTmin<Pinmax<PinTmin (VEmin<VET<VEmax):
  MCM systems (Mixed Conduction Mode);

Pinmax>PinTmax (VET>VEmax): CCM systems.

According to the functioning mode of all PWM controllers that implement a peak current control, like for example the L4990, the peak voltage on the ISEN pin, Vcs, is related to the control voltage (that is, the output voltage of the error amplifier E/A), by the following equation:

$$V_{comp} = 3 \cdot V_{cs} + 2 \cdot V_f \tag{15}$$

In turn, the peak voltage on the ISEN pin depends on the peak current (irrespective of the operating mode) according to the relationship:

$$V_{cs} = R_s \cdot I_{pkp} + V_o \tag{16}$$

wherein Vo is an offset voltage externally imposed on the ISEN pin, for instance a "slope compensation" or any other type of correction voltage.

According to a fundamental aspect of this invention, the power that may be output by a DC—DC converter that employs a current mode PWM controller, can be controlled in a manner that its maximum value is substantially constant as the frequency varies, regardless of the form, amplitude and duration of the synchronizing pulses. This is achieved by impressing on a pin (referred to as ISEN) dedicated to the connection of an external resistor or sensing the current, an offset voltage that increases with the frequency or, alternatively, by clamping the output voltage of the error amplifier of the controller to a voltage that decreases with the frequency.

While the compensation circuit of the invention may be realizable externally of the controller, a particularly advantageous embodiment of the invention includes integrating the compensation circuit capable of implementing such important function, within the controller device.

In several commercial devices there exist one or more unused pins that can be advantageously used to integrate the circuit of the invention without in any way altering the existing controller layout. An example of this is the device L4990 wherein pin 16 is not used and can then be used to implement the control function of the output power according to the method of the invention. If pins are not available, a simple circuit modification may be sufficient to integrate the circuit of the invention, in a way as to be either enabled or disabled, or eventually another function, unused in the particular application can be scarified to permit the enabling of the power control function of the invention.

Figure 8:
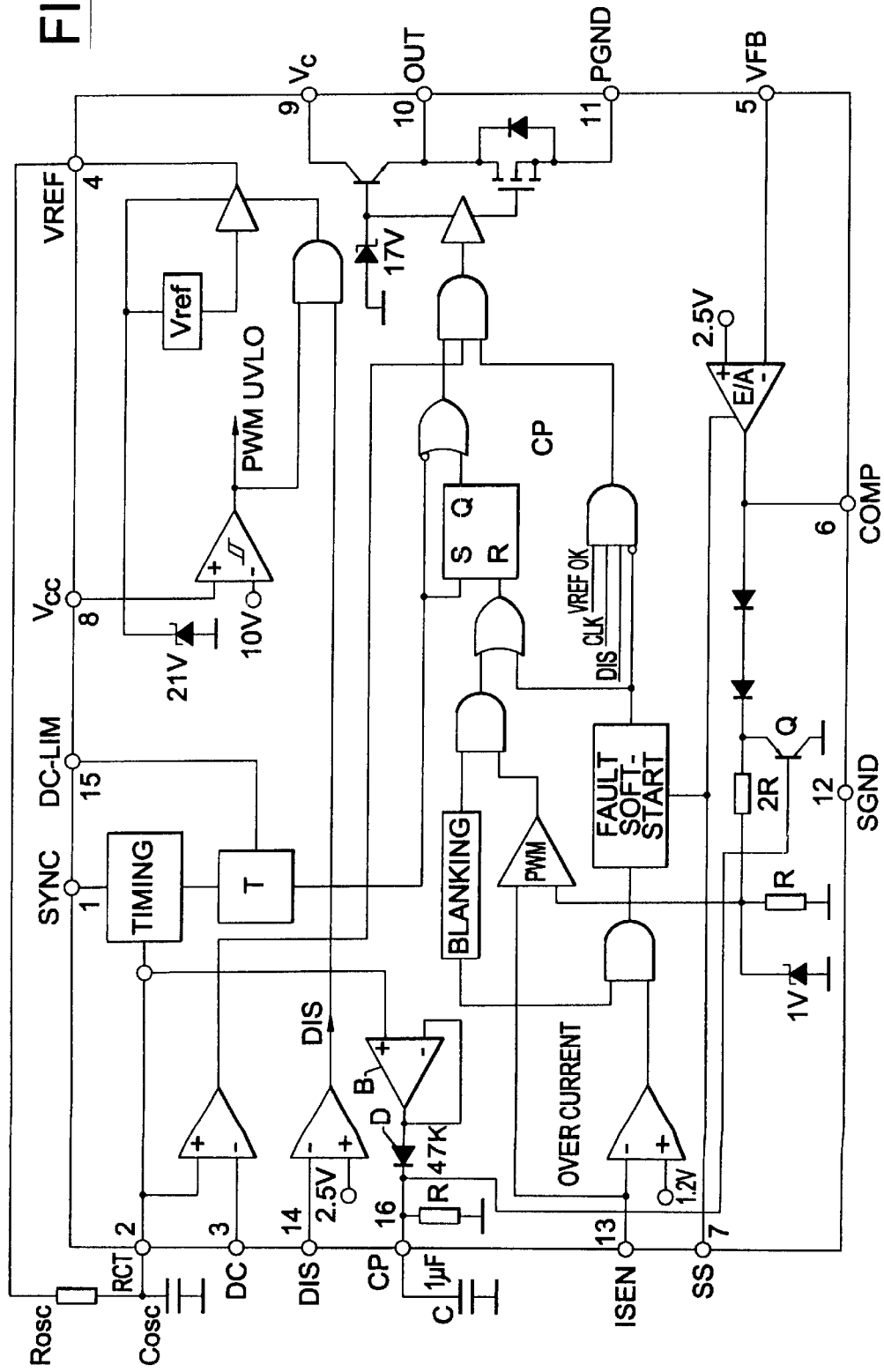
FIG. 8 is an electric scheme that shows an embodiment of the compensation circuit of the invention integrated in a controller according to the invention.

A particularly preferred embodiment of the invention requiring a simpler circuit than that needed to inject an offset voltage on the current sensing node, includes clamping the output voltage of the controller's error amplifier to a voltage level that decreases with the frequency. This preferred embodiment is shown in FIG. 8, by highlighting with a thicker line the compensation circuit of the invention.

Of course, the same circuit may also be realized externally to the integrated controller. The only inaccessible node being in this case represented by the emitter node of the clamp transistor "Q". However, such a connection may be produced externally of the integrated device by simply connecting two external diodes between the pin 6 (Comp) of the integrated device and the emitter of the external transistor "Q".

Analysis of the Operation of the Compensation Circuit of the Invention

Figure 9:
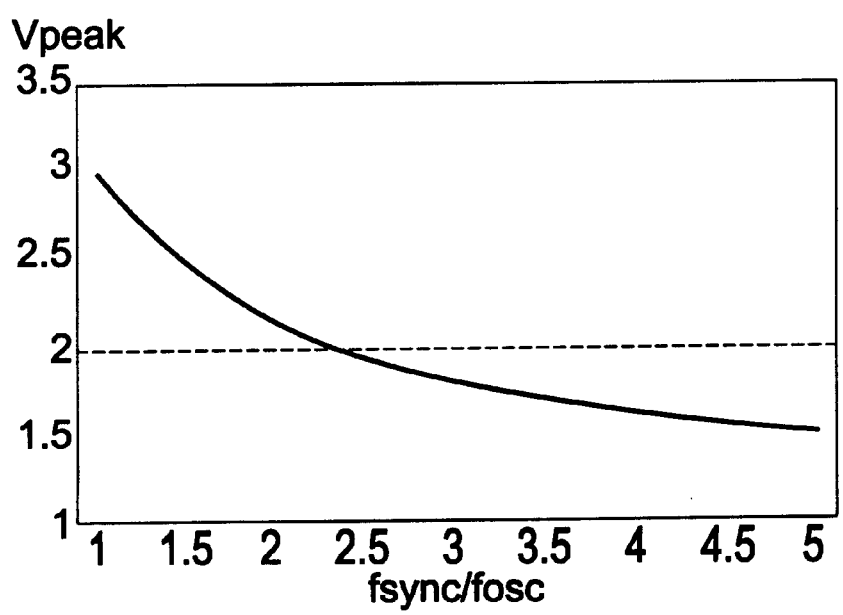
FIG. 9 shows the trend of the peak voltage of the signal produced by the sawtooth local oscillator as a function of the frequency of the synchronizing signal according to the invention.

The synchronization of the oscillator with an external signal of frequency $fsync \in (fmin, fmax)$ implies in the first place that such an external signal be set with a frequency fosc slightly lower (typically of about 10–20%) than fmin and secondly that the amplitude of the generated sawtooth diminishes as fsync increases. Such a decrease of amplitude is due to the reduction of Vpeak alone, since the bottom value remains unchanged. By neglecting the sawtooth fall time, the following expression holds true:

$$V_{peak} = 5 - 2^{\left(2 - \frac{fosc}{fsync}\right)} \tag{39}$$

whose characteristic is depicted in FIG. 9.

This voltage, obtained through a peak detector circuit (basically a diode and a capacitor, properly buffered to avoid influencing the oscillator), is independent from the parameters of the synchronizing pulses and may be used as the clamp voltage level for the E/A output, that is, of the VCLT voltage in the considered case of an integrated embodiment.

The available pin 16 is in this case used to connect the external capacitor of the peak detector circuit, since a capacitance on the order of 1 $\mu$F, which is not realizable in an integrated form, is required. Moreover the use of an external capacitor renders it possible to trim the circuit.

Two conditions must be fulfilled by the circuit:

1) the correction performed should be close to the ideal one;

2) the compensation circuit should not interfere with the functioning of the converter when the controller's oscillator is not synchronized, that is, the clamping should be able to disabled in the case of applications that do not require a control of the output peak power.

The peak voltage level of the non-synchronized oscillator is, in the example considered, 3V, the second condition, as shown by equations (17) and (18), may be easily fulfilled. The first condition remains to be verified.

From equations (1), (14), (16), where Vo is set to 0, and (17), the clamp voltage required to keep the input power constant to a value Pinmax may be derived to be given by:

$$V_{clamp} = \begin{cases} 3 \cdot R_s \cdot \sqrt{\dfrac{2 \cdot P_{inmax}}{L_p \cdot fsync}}, & fsync \leq f_T \\ 3 \cdot R_s \cdot \left(\dfrac{P_{inmax}}{V_E} + \dfrac{V_E}{2 \cdot L_p \cdot f_{sync}}\right), & f_{sync} > f_T \end{cases} \tag{40}$$

where fT, from equation (10), is given by:

$$f_t = \frac{V_E^2}{2 \cdot L_p \cdot P_{inmax}} \tag{41}$$

Equation (40) represents the ideal correction law. The equation shows its independence from VE and therefore from the input voltage when fsync<fT, that is in DCM operation whereas it is dependent from VE when fsync>fT, that is in CCM operation. fT, that is the frequency at which the ideal correction law changes its expression, is also dependent on VE. By contrast, the theoretical law given by equation (39) has a sole expression and depends only from the ratio fosc/fsync.

To compare equation (39) with equation (40) and evaluate the relative departure from one another, it may be convenient to rewrite (40) in a more convenient form. In the first place, we replace (41), explicit with respect to VE, in the second one of the equations (40), thus obtaining:

$$V_{clamp} = \begin{cases} 3 \cdot R_s \cdot \sqrt{\dfrac{2 \cdot P_{inmax}}{L_p \cdot fsync}}, & f_{sync} \leq F_T \\ 3 \cdot R_s \cdot \sqrt{\dfrac{P_{inmax}}{2 \cdot L_p}} \cdot \left(\dfrac{1}{\sqrt{fr}} + \dfrac{\sqrt{fr}}{f_{sync}}\right), & f_{sync} > f_T \end{cases} \quad (42)$$

Let us assume to select the primary winding inductance Lp to be equal to:

$$L_p = \frac{V_E^2 \min}{2 \cdot f_T \cdot P_{inmax}} \quad (43)$$

In this way, it is understood that by transition frequency fT, we mean the minimum, that is the one that is obtained when VE=Vemin.

By introducing a parameter k, represented by a positive value, such that:

$$f_T = k \cdot f_{osc} \quad (44)$$

certain important considerations may be simplified as follows.

By substituting (43) and (44), in both equations (42), the following expressions are obtained:

$$V_{clamp} = \begin{cases} 3 \cdot R_s \cdot \dfrac{2 \cdot P_{inmax}}{V_{Emin}} \cdot \sqrt{\dfrac{k \cdot f_{osc}}{f_{sync}}}, & f_{sync} \leq k \\ 3 \cdot R_s \cdot \dfrac{P_{inmax}}{V_{Emin}} \cdot \left(1 + k \cdot \dfrac{f_{osc}}{f_{sync}}\right) \cdot \dfrac{f_{sync}}{f_{osc}}, & f_{sync} > k \end{cases} \quad (45)$$

Since the ratio Fsync/fosc is always greater than 1, the first of the two equations (45) applies if k>1.

The resistance Rs is chosen to fulfill condition 2), in other words when fsync/fosc=1, Vclamp=3V. This is expressed in the following equations:

$$R_s = \begin{cases} \dfrac{V_{Emin}}{2 \cdot \sqrt{k} \cdot P_{inmax}}, & k \geq 1 \\ \dfrac{V_{Emin}}{(1+k) \cdot P_{inmax}}, & k \leq 1 \end{cases} \quad (46)$$

Equation (39) will be now compared with (45), taking into account equation (46), calculated for different values of k.

From equation (44) we deduce that the smaller is k the more the system functions in CCM, by contrast, greater values of k indicate a shift towards a DCM. From a practical point of view, the top value of k is limited by fmax/fosc (indeed, from this value onwards the functioning is always discontinuous and thereby the ideal correction law would not change any more). As far as the lower value of k is concerned, it would not make much sense to consider extremely low values since for k→0 (that is, moving more and more towards a CCM) the primary current tends to become rectangular and therefore Pinmax tends to be come independent from the frequency.

It has been found that 0.1 is an appropriate value, whereas for the ratio fmax/fosc a practical value may be assumed equal to 5.

Figure 10A:
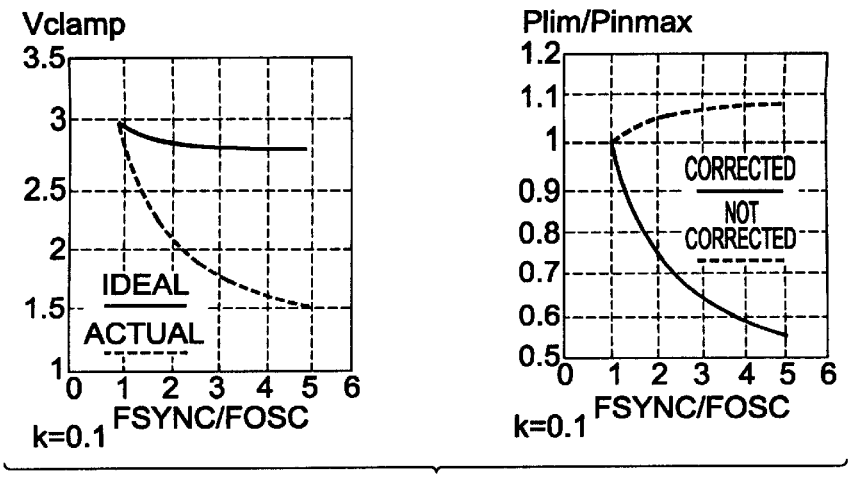
FIGS. 10a, 10b, 10c, 10d, 10e and 10f show the correction performed by the compensating circuit of the invention for different values of the K-parameter.
Figure 10B:
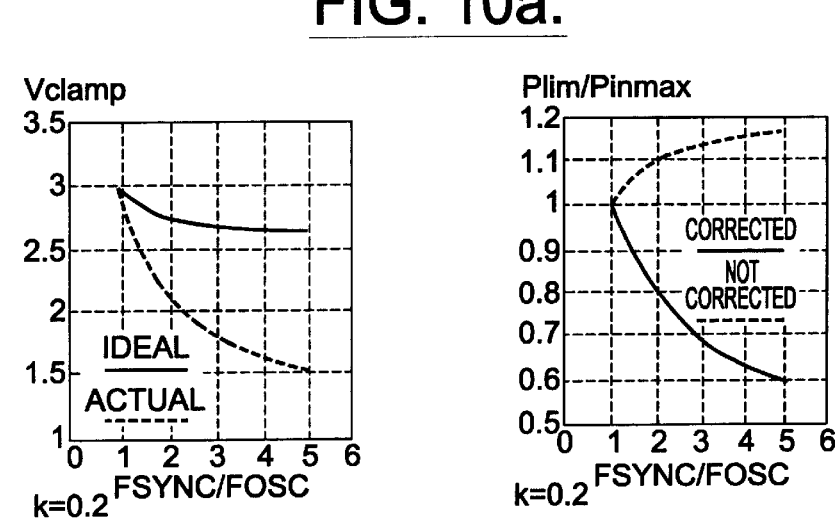
Figure 10C:
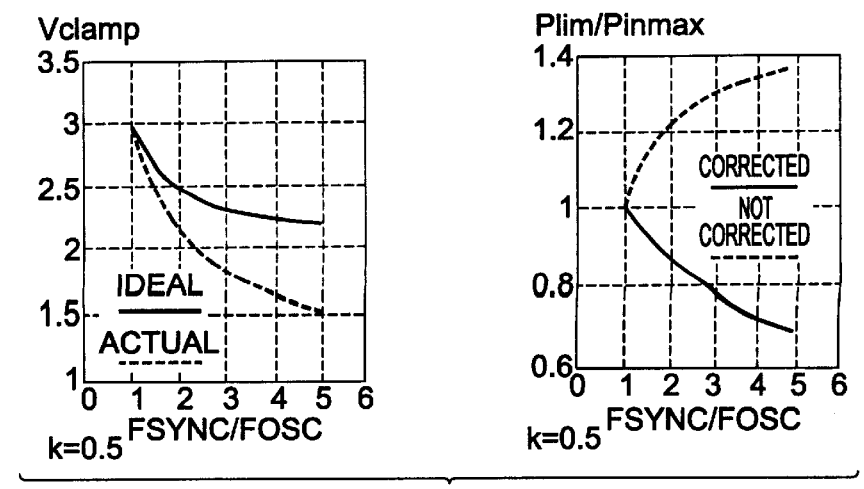
Figure 10D:
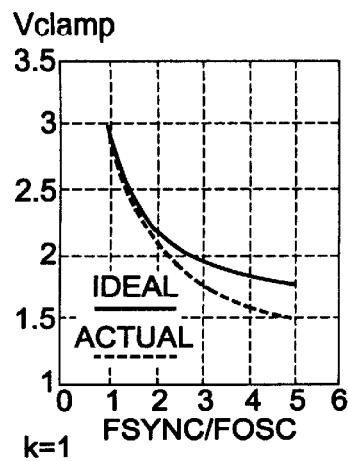
Figure 10D:
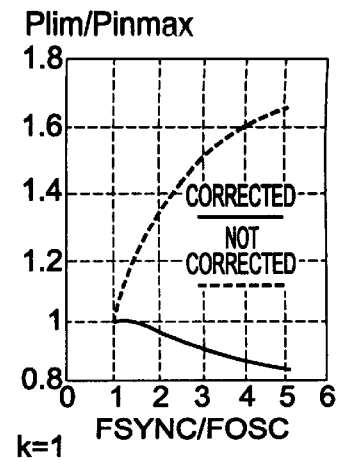
Figure 10E:
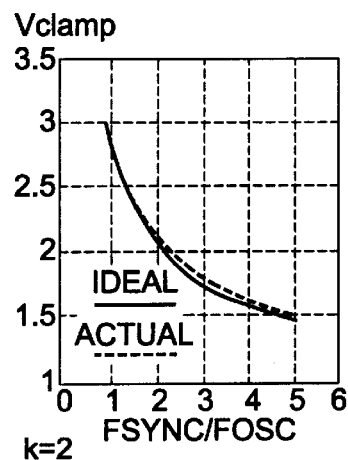
Figure 10E:
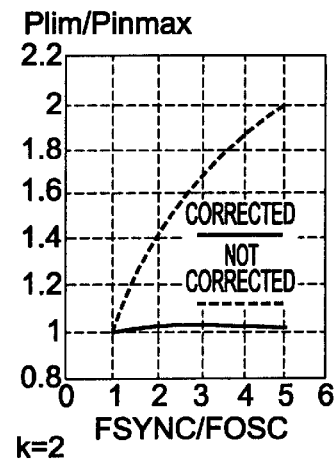
Figure 10F:
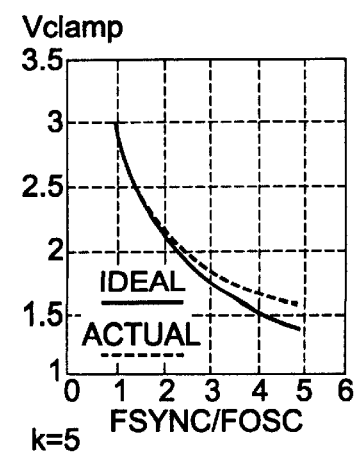
Figure 10F:
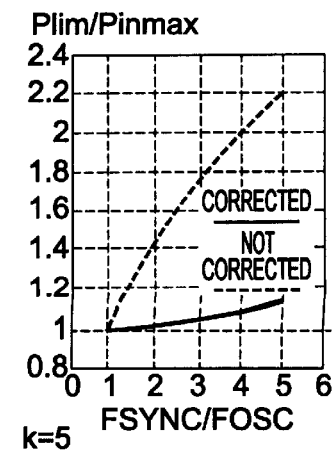

The diagrams shown in FIGS. 10a, 10b, . . . , 10f, compare the behavior of the equations (39) and (45) as well as the ratios between the maximum power effectively obtained Plim and the desired one Pinmax, with and without the correction (39), for different values of the parameter k.

From examining the characteristic curves of FIGS. 10a to 10f, it may be observed that when the system is "very" CCM (k≤0.2) the correction is marked limiting the high frequency power output well below the desired value. However, under these conditions, even without correction, the increment of power with the frequency is rather contained (<15%) and thereby these systems do not require any correction in practice.

For systems "moderately" CCM (k>>0.5) the most critical situation in encountered: the system does require correction though this is still too heavy (>>30%).

A more acceptable behavior is observed for k>>1: the correction performs a reduction or less than 20% and a power slightly higher than desired at low frequency may be tolerated in order to obtain substantially the required one at high frequency.

As the system gets and closer to DCM functioning, for values of k>>2, the correction system operates in an ideal situation whereby the correction is almost perfect (<4%). The correction remains good even for "very" DCM systems (k>>5) and the power increment with the frequency remains less than 15%.

In conclusion, it is advisable to design the system with the parameter k≧1 in order to exploit at best the control of the maximum output power provided by the compensation circuit of the invention.

By referring to the circuit scheme of the embodiment of FIG. 8, the group formed by the comparator-buffer (B), by the diode (D) and by the external capacitor (C) of 1 μF, represents the peak detector, while the 47 kOhm resistor (R) permits the discharge of the capacitor (C) when the synchronizing frequency increases. The value of the time constant should be greater than 1/fosc even if this is not critical, therefore the values shown in the figure may be satisfactory in a large majority of cases, and in particular within the range of the monitors synchronizing frequencies (typically of 25–100 kHz) used in monitors. The PNP transistor (Q) clamps the output voltage of the E/A to a Vbe above the capacitor C voltage, recuperating the drop on the diode D of the detecting circuit.

An integrated realization requires the availability of just one pin to connect the external capacitor C. When not required, the function may be disabled by connecting the pin 16 to the reference voltage Vref, that is to pin 4.

Figure 11:
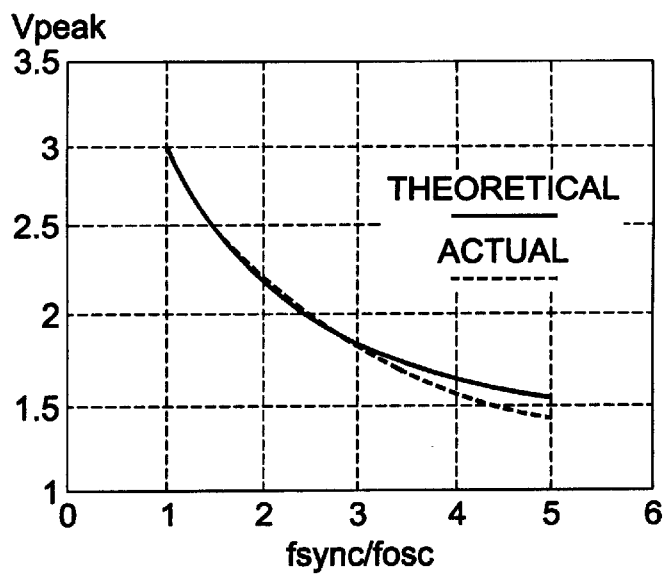
FIG. 11 show the comparison between the theoretical and real trend of the correction law of the circuit of the invention following an optimization of the circuit parameters.

Finally, what remains to verify is whether the circuit implements the correction law theoretically determined by equation (39). The results of tests undertaken on the circuit of FIG. 8, together with the theoretical values, are reported in Table 3 and illustrated in the diagram of FIG. 11.

$$V^1{}_{peak} = \left(1.717 - 0.334 \cdot \log \frac{f_{sync}}{f_{osc}}\right)^2 \quad (47)$$

The offset between the theoretical and actual behavior, analytically representable by the following best fit curve:

$$V^1{}_{peak} = \left(1.717 - 0.334 \cdot \log \frac{f_{sync}}{f_{osc}}\right)^2 \quad (47)$$

is rather contained. At high frequencies, can be observed a slightly higher correction than the theoretically determined which is advantageous in systems where a DCM (k>1) behavior is prevailing.

The real characteristic, represents the effects of the time TOFF which is neglected in an ideal representation of the characteristics of the diodes and the PNP used and could be slightly shifted high through a different selection of the components thus improving correspondence with the theoretical model.

Figure 12:
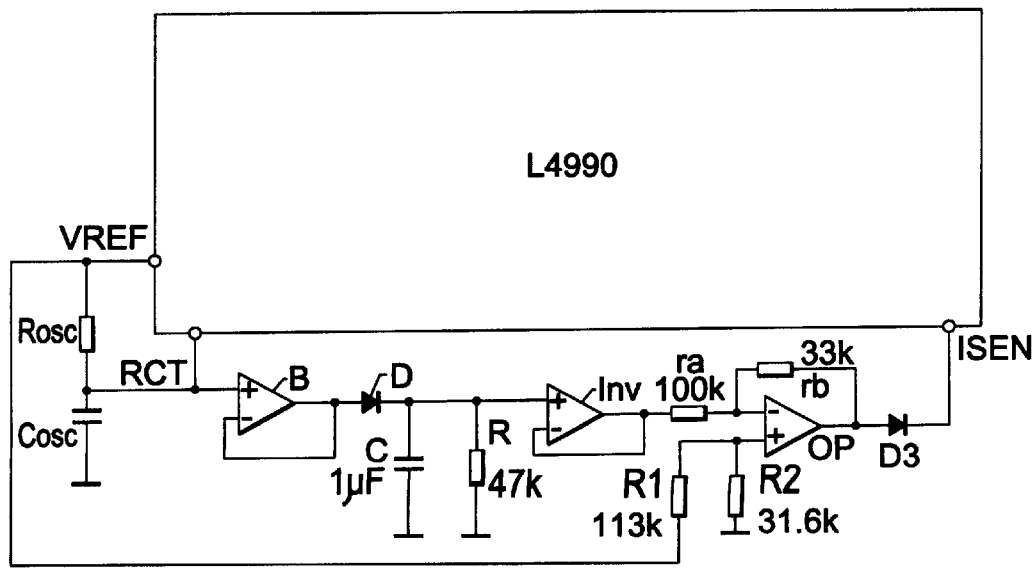
FIG. 12 is a partial electric scheme depicting an alternative embodiment of the circuit of the invention implemented externally to the integrated controller device.

An alternative embodiment of the circuit of invention is illustrated in FIG. 12. To simplify the illustration, the circuit scheme is in this instance for an embodiment external to the controller integrated circuit, typically represented by the same device L4990. According to this alternative embodiment, the DC signal obtained by detecting the sawtooth signal produced by the oscillator as a function of the synchronizing frequency, is not exploited to clamp at a voltage proportional to the DC signal generated by the detector circuit, the output voltage of the controller's error amplifier E/A. Instead the DC signal is used to inject an offset voltage of an amplitude that increases with the frequency of the converter, on the current sensing node (ISEN) (on the pin 13 of FIGS. 1 and 8, dedicated to the connection of an external current sensing resistor).

According to this alternative embodiment, the detector's DC signal must be inverted by employing a buffer to change its dependence from the frequency. Furthermore, according to the above analysis, the detected (rectified) and inverted DC signal must be divided by three and suitably shifted, bearing in mind equation (15). This is realized by the operational amplifier OP, provided of a consequent feedback network formed by the resistors $r_a$ and $r_b$, as shown in the diagram, and by using a voltage divider constituted by R1 and R2 to shift the level of output voltage to be applied to the ISEN node (pin 13).

That which is claimed is:

1. A method of controlling the power output of a static DC—DC converter of a type comprising a current mode PWM controller, the current mode PWM controller comprising an oscillator including a resistor-capacitor (R-C) circuit connected between a node at a reference voltage and ground, and an error amplifier having an output voltage referred to a pre-established voltage, the method comprising the steps of:

detecting a periodic signal produced by the oscillator on the capacitor of the R-C circuit and generating a DC signal having an amplitude inversely related to a frequency of the periodic signal; and clamping the output voltage of the error amplifier at a voltage having an amplitude related to the amplitude of the generated DC signal.

2. A method according to claim 1, wherein the step of generating the DC signal comprises generating the DC signal to have an amplitude inversely proportional to the frequency of the periodic signal.

3. A method according to claim 2, wherein the step of clamping comprises clamping the error amplifier at a voltage having an amplitude proportional to the amplitude of the generated DC signal.

4. A method according to claim 1, wherein the oscillator comprises a sawtooth oscillator; and wherein the step of detecting comprises detecting a sawtooth periodic signal from the sawtooth oscillator.

5. A method of controlling the power output of a static DC—DC converter of a type comprising a current mode PWM controller and a power switch connected thereto, the current mode PWM controller comprising an oscillator including a resistor-capacitor (R-C) circuit connected between a node at a reference voltage and ground, a current sensing resistor functionally connected in series with the power switch, and a current control circuit using the current sensing resistor, the method comprising the steps of:

detecting a periodic signal produced by the oscillator on the capacitor of the R-C circuit and generating a DC signal having an amplitude inversely related to a frequency of the periodic signal; and offsetting a signal present on said current sensing resistor by a voltage corresponding to a difference between a constant voltage and the generated DC signal.

6. A method according to claim 5, wherein the step of generating the DC signal comprises generating the DC signal to have an amplitude inversely proportional to the frequency of the periodic signal.

7. A method according to claim 5, wherein the oscillator comprises a sawtooth oscillator; and wherein the step of detecting comprises detecting a sawtooth periodic signal from the sawtooth oscillator.

8. A current mode PWM controller comprising:

an oscillator including a resistor and a first capacitor defining a resistor-capacitor (R-C) circuit coupled between a node at a reference voltage and ground;

an error amplifier of an output voltage referred to a pre-established voltage; and a current control circuit comprising a current sensing resistor to be functionally connected in series with a power switch, and control means for controlling an output power by varying a switching frequency of the power switch, said control means comprising a detecting and generating circuit for detecting a periodic signal produced on the first capacitor of said R-C circuit and for generating a DC signal having an amplitude inversely related to a frequency of the periodic signal, and a clamp stage for clamping the output voltage of said error amplifier at a voltage level related to the DC signal.

9. A current mode PWM controller according to claim 8, wherein the detecting and generating circuit further comprises a second capacitor for determining a time constant; wherein the current mode PWM controller comprises a completely integrated portion except for the second capacitor; and wherein the second capacitor is externally connectable to the completely integrated portion through a dedicated connecting pin.

10. A current mode PWM controller according to claim 8, further comprising a detecting diode having an anode; and wherein said detecting and generating circuit comprises a buffer amplifier functionally connected between the first capacitor and the anode of the detecting diode.

11. A current mode PWM controller according to claim 10, wherein said clamp stage comprises a PNP transistor having a base coupled to the detecting diode, a collector coupled to ground, and an emitter coupled to the output of the error amplifier.

12. A current mode PWM controller according to claim 11, further comprising two directly biased diodes connected in cascade between the output of the error amplifier and the emitter of the PNP transistor.

13. A current mode PWM controller according to claim 8, wherein the detecting and generating circuit comprises means for generating the DC signal to have an amplitude inversely proportional to the frequency of the periodic signal.

14. A current mode PWM controller according to claim 13, wherein the clamping stage comprises means for clamping the output of the error amplifier at a voltage having an amplitude proportional to the amplitude of the generated DC signal.

15. A current mode PWM controller according to claim 8, wherein the oscillator comprises a sawtooth oscillator.

16. A current mode PWM controller comprising:

an oscillator including a resistor and a first capacitor defining a resistor-capacitor (R-C) circuit coupled between a node at a reference voltage and ground;

an error amplifier of an output voltage referred to a pre-established voltage; and a current control circuit comprising a current sensing resistor to be functionally connected in series with a power switch and control means for controlling an output power by varying a switching frequency of the power switch, said control means comprising a detecting and generating circuit for detecting a periodic signal produced on the first capacitor of said R-C circuit and for generating a DC signal having an amplitude inversely related to a frequency of the periodic signal, and an offset circuit for offsetting a signal present on said current sensing resistor by a voltage corresponding to a difference between a constant voltage and the oscillator DC signal.

17. A current mode PWM controller according to claim 16, wherein the detecting and generating circuit further comprises a second capacitor for determining a time constant; wherein the current mode PWM controller comprises a completely integrated portion except for the second capacitor; and wherein the second capacitor is externally connectable to the completely integrated portion through a dedicated connecting pin.

18. A current mode PWM controller according to claim 16, further comprising a detecting diode having an anode; and wherein said detecting and generating circuit comprises a buffer amplifier functionally connected between the first capacitor and the anode of the detecting diode.

19. A current mode PWM controller according to claim 16, wherein the detecting and generating circuit comprises means for generating the DC signal to have an amplitude inversely proportional to the frequency of the periodic.

20. A current mode PWM controller according to claim 19, wherein the offset circuit comprises means for offsetting the signal present on said current sensing resistor by a voltage corresponding to a difference between a constant voltage and the generated DC signal.

21. A power supply for a scanning circuit of a cathode ray tube operating at varying frequencies of synchronization and comprising:

a static DC—DC converter comprising a current mode PWM controller, said current mode PWM controller comprising an oscillator including a resistor and a first capacitor defining a resistor-capacitor (R-C) circuit coupled between a node at a reference voltage and ground;

an error amplifier of an output voltage referred to a pre-established voltage; and a current control circuit comprising a current sensing resistor to be functionally connected in series with a power switch and control means for controlling an output power by varying a switching frequency of the power switch, said control means comprising a detecting and generating circuit for detecting a periodic signal produced on the first capacitor of said R-C circuit and for generating a DC signal having an amplitude inversely related to a frequency of the periodic signal, and a clamp stage for clamping the output voltage of said error amplifier at a voltage level related to the DC signal.

22. A power supply according to claim 21, wherein the detecting and generating circuit further comprises a second capacitor for determining a time constant; wherein the current mode PWM controller comprises a completely integrated portion except for the second capacitor; and wherein the second capacitor is externally connectable to the completely integrated portion through a dedicated connecting pin.

23. A power supply according to claim 21, further comprising a detecting diode having an anode; and wherein said detecting and generating circuit comprises a buffer amplifier functionally connected between the first capacitor and the anode of the detecting diode.

24. A power supply according to claim 23, wherein said clamp stage comprises a PNP transistor having a base coupled to the detecting diode, a collector coupled to ground, and an emitter coupled to the output of the error amplifier.

25. A power supply according to claim 24, further comprising two directly biased diodes connected in cascade between the output of the error amplifier and the emitter of the PNP transistor.

26. A power supply according to claim 21, wherein the detecting and generating circuit comprises means for generating the DC signal to have an amplitude inversely proportional to the frequency of the periodic signal.

27. A power supply according to claim 26, wherein the clamping stage comprises means for clamping the output of the error amplifier at a voltage having an amplitude proportional to the amplitude of the generated DC signal.

28. A power supply according to claim 21, wherein the oscillator comprises a sawtooth oscillator.

29. A power supply for a scanning circuit of a cathode ray tube operating at varying frequencies of synchronization and comprising:

a static DC—DC converter comprising a current mode PWM controller, said current mode PWM controller comprising an oscillator including a resistor and a first capacitor defining a resistor-capacitor (R-C) circuit coupled between a node at a reference voltage and ground;

an error amplifier of an output voltage referred to a pre-established voltage; and a current control circuit comprising a current sensing resistor to be functionally connected in series with a power switch and control means for controlling an output power by varying a switching frequency of the power switch, said control means comprising a detecting and generating circuit for detecting a periodic signal produced on the first capacitor of said R-C circuit and for generating a DC signal having an amplitude inversely related to a frequency of the periodic signal, and an offset circuit for offsetting a signal present on said current sensing resistor by a voltage corresponding to a difference between a constant voltage and the DC signal.

30. A power supply according to claim 29, wherein the detecting and generating circuit further comprises a second capacitor for determining a time constant; wherein the current mode PWM controller comprises a completely integrated portion except for the second capacitor; and wherein the second capacitor is externally connectable to the completely integrated portion through a dedicated connecting pin.

31. A power supply according to claim 29, further comprising a detecting diode having an anode; and wherein said detecting and generating circuit comprises a buffer amplifier functionally connected between the first capacitor and the anode of the detecting diode.

32. A power supply according to claim 29, wherein the detecting and generating circuit comprises means for generating the DC signal to have an amplitude inversely proportional to the frequency of the periodic signal.

33. A power supply according to claim 29, wherein the oscillator comprises a sawtooth oscillator.

* * * * *

UNITED STATES PATENT AND TRADEMARK OFFICE
CERTIFICATE OF CORRECTION

PATENT NO. : 6,011,706
DATED : January 4, 2000
INVENTOR(S) : Claudio Adragna, Giuseppe Gattavari, Mauro Fagnani It is certified that error appears in the above-identified patent and that said Letters Patent is hereby corrected as shown below:

Column 6, line 7      Strike: "mains"
                                  Insert: - -main- -

Column 8, line 31      Insert: - -be- - before "disabled"

Column 10, line 50     Strike:

$$V^1{}_{peak} = \left| 1.717 - 0.334 \cdot \log \frac{f_{sync}}{f_{osc}} \right|^2$$

Insert:

TABLE 3

|   | Theoretical | Actual | Diff. % |
|---|---|---|---|
| 1 | 3 | 2.959 | -1.37 |
| 1,5 | 2.48 | 2.5 | 0.81 |
| 2 | 2.172 | 2.207 | 1.61 |
| 2,5 | 1.969 | 1.983 | 0.71 |
| 3 | 1.825 | 1.812 | -0.71 |
| 3,5 | 1.719 | 1.676 | -2.5 |
| 4 | 1.636 | 1.565 | -4.34 |
| 4,5 | 1.571 | 1.479 | -5.86 |
| 5 | 1.518 | 1.41 | -7.11 |

Column 13, line 19     Strike: "oscillator"

UNITED STATES PATENT AND TRADEMARK OFFICE
CERTIFICATE OF CORRECTION

PATENT NO. : 6,011,706  
DATED : January 4, 2000  
INVENTOR(S) : Claudio Adragna, Giuseppe Gattavari, Mauro Fagnani Page 2 of 2

It is certified that error appears in the above-identified patent and that said Letters Patent is hereby corrected as shown below:

Drawings      Strike Figure 6

Insert:

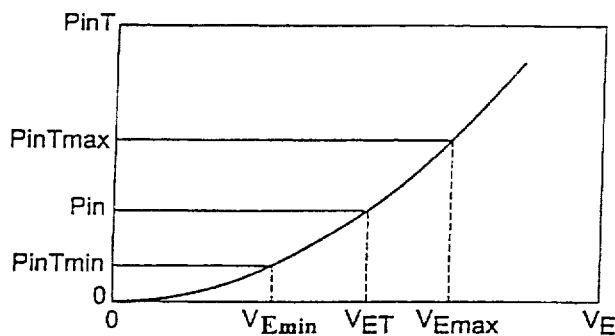

FIG. 6.
(PRIOR ART)

Signed and Sealed this

Seventh Day of November, 2000

Attest:

Q. TODD DICKINSON

*Attesting Officer*      *Director of Patents and Trademarks*